Oct. 29, 1929.  F. A. STEVENSON  1,733,140
CUPOLA FURNACE
Filed Feb. 26, 1929   3 Sheets-Sheet 1
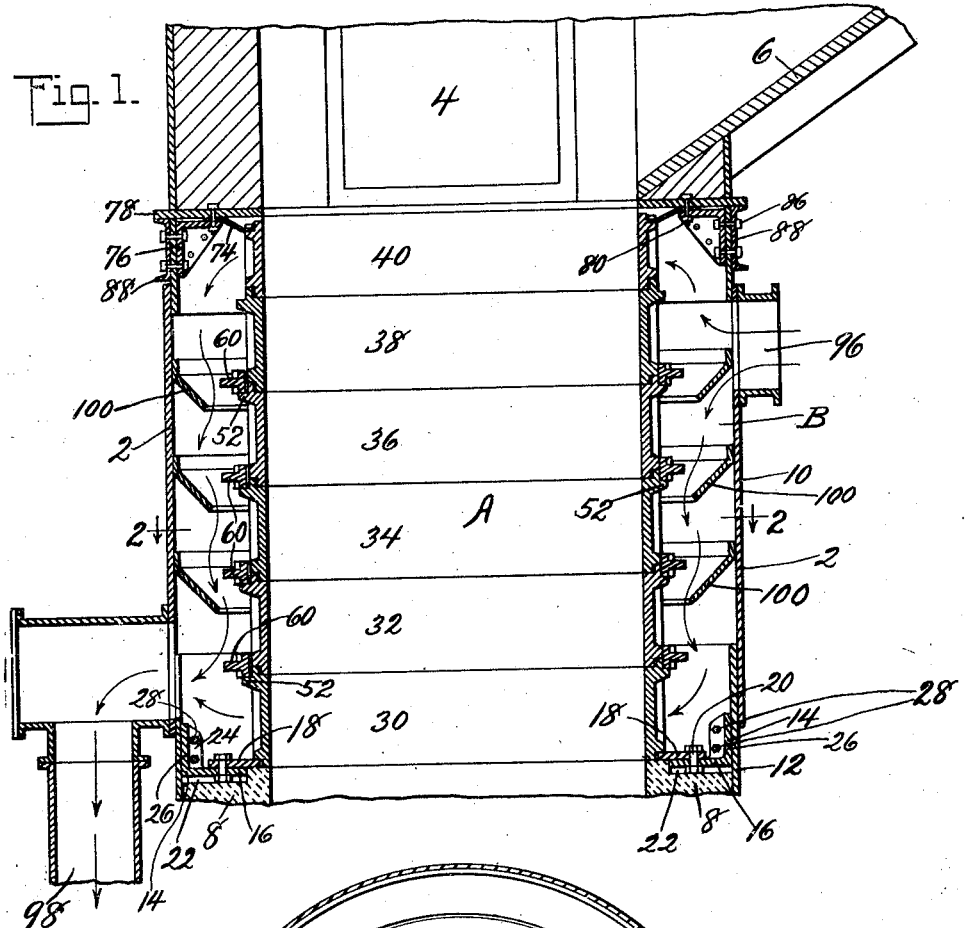
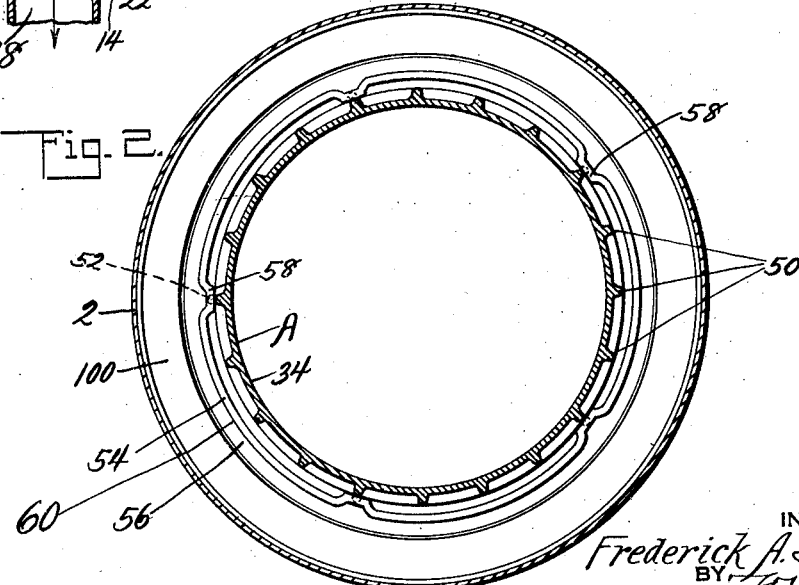
INVENTOR
Frederick A. Stevenson
BY
ATTORNEY

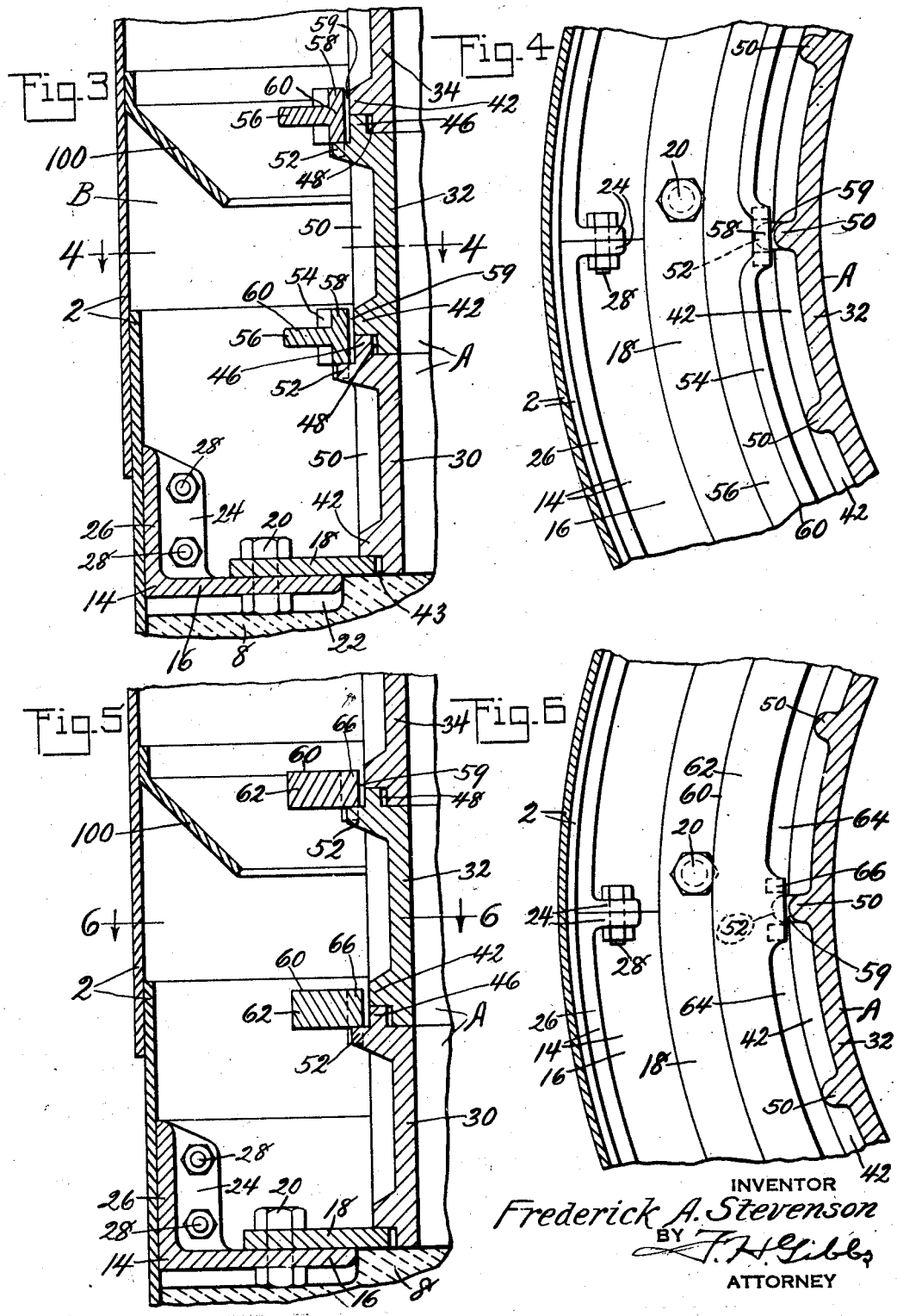

Oct. 29, 1929.    F. A. STEVENSON    1,733,140
CUPOLA FURNACE
Filed Feb. 26, 1929    3 Sheets-Sheet 3
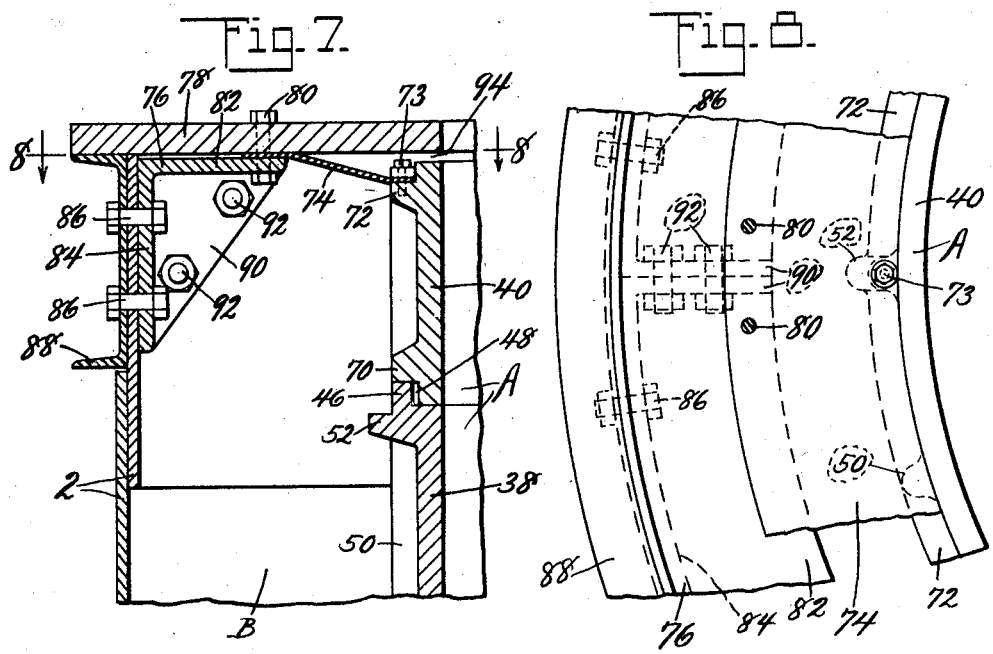
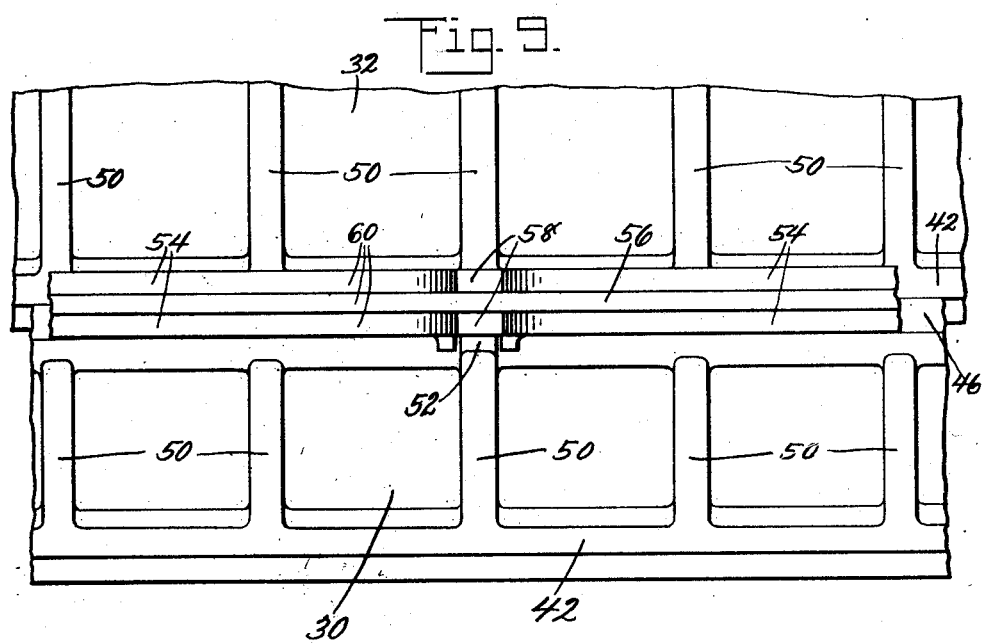
INVENTOR
Frederick A. Stevenson
BY
ATTORNEY Patented Oct. 29, 1929

1,733,140

UNITED STATES PATENT OFFICE

FREDERICK A. STEVENSON, OF NEW YORK, N. Y., ASSIGNOR TO ECONOMY METAL PRODUCTS CORPORATION, OF NEW YORK, N. Y., A CORPORATION OF NEW YORK

CUPOLA FURNACE

Application filed February 26, 1929. Serial No. 342,906.

This invention relates to cupola furnaces and contemplates certain improvements in the construction of furnace shown in my prior applications, Serial No. 252,506, filed February 7, 1928, and No. 289,100, filed June 29, 1928.

As pointed out clearly in the aforesaid applications, it has been found desirable to reduce the temperature in the shaft of a furnace above the preheating zone whereby to reduce the gas producer effect of the furnace. It has also been found that the reduction of the temperature in the shaft of the furnace, as just stated, serves to retain the fuel in that portion of the shaft at a relatively low temperature and at a temperature insufficient to materially affect the heat units in the fuel, thereby retaining substantially the full value of the heat units until they reach the preheating zone.

Like the prior applications, this invention contemplates the substitution of a metallic liner for a portion of the refractory lining of the furnace, which is usually continuous from end to end of the furnace; the metallic liner providing, with the outer sheathing of the furnace, a chamber to which air is admitted and where it is heated by heat from the metallic liner, the latter absorbing heat from the shaft of the furnace adjacent the liner in order to maintain that portion of the furnace shaft in a comparatively cool condition to prevent the loss of heat units in the fuel until the latter reaches the preheating zone.

In view of the above, one object of the present invention is the provision of a furnace, the shaft of which is, in effect, provided with an upper or cool zone, a lower or melting zone, and an intermediate or preheating zone.

A further object of the invention is the provision of a metallic liner for a portion of the furnace shaft.

Another object of the invention is the provision of a furnace shaft having a portion thereof comprising a liner formed of superposed metallic rings.

Another object of the invention is the provision of a furnace shaft a portion of which is formed of a metallic liner comprising a plurality of superposed rings with the lower ends of superposed rings in nested relation with the upper ends of the rings on which they are superposed.

Still another object of the invention is the provision of means engaging the meeting edges of adjacent superposed rings which form a metallic liner for a portion of a furnace shaft for the purpose of preventing distortion of the rings as the result of continuous expansion and contraction.

Another object of this invention is the provision of a furnace having, as a portion of the liner thereof, a plurality of superposed metallic rings and with means surrounding said rings to strengthen or reinforce the latter when the reach the limit of their expansion whereby said rings are restrained against distortion.

As another object, the invention comprises a cupola furnace having a metallic liner forming a portion of the shaft thereof and comprising superposed rings and means with which the rings are adapted to contact when approximately at the limit of their expansion under the influence of heat to strengthen the said rings and to prevent distortion thereof, and, further, to serve as a safety medium for retaining the rings in position should any one or more thereof be cracked or broken, thereby preventing the escape of material from the furnace shaft.

A still further object of the present invention is the provision of a new and improved type of cupola furnace which is comparatively simple and easy to manufacture and strong and durable in operation and in which the consumption of fuel is reduced to a minimum.

Other objects and advantages of this invention will be apparent from the following description taken in conjunction with the accompanying drawings in which:

Figure 1 is a sectional view through the upper portion of a furnace of the present invention;

Fig. 2 is a sectional view on the line 2—2, Fig. 1;

Fig. 3 is an enlarged fragmentary sectional view of the furnace showing the sheathing and liner rings in assembled relation;

Fig. 4 is a sectional view on the line 4—4, Fig. 3;

Fig. 5 is a sectional view similar to Fig. 3, but showing a modification of the invention;

Fig. 6 is a sectional view on the line 6—6, Fig. 5;

Fig. 7 is a fragmentary detail view showing the construction at the upper end of the furnace shaft;

Fig. 8 is a sectional view on the line 8—8, Fig. 7; and

Fig. 9 is a fragmentary side elevation of two assembled rings.

Referring now in detail to the drawings, and particularly to Fig. 1, 2 designates the sheathing of a cupola furnace, which latter is mounted on a suitable base (not shown) and which furnace is provided with the usual charging doors 4 and a chute 6; the furnace having a refractory lining 8 which extends upwardly above the melting zone of the furnace.

The furnace of the present invention contemplates the provision of a metallic liner for a portion of the shaft of the furnace and in substitution of a portion of the refractory lining, which is usually continuous throughout the furnace shaft; said metallic liner being designated generally in Fig. 1 as A and defining, with the outer sheathing 2, a chamber B which is adapted to receive atmospheric air to be heated by heat transferred from the furnace shaft at this portion of the furnace through the metallic liner; said heated air being subsequently passed through a down-comer into the wind-box (not shown) of the furnace to be injected through the usual tuyères into the furnace shaft. By heating the air, as just described, it is apparent that the temperature in the zone of the furnace adjacent the metallic liner is correspondingly reduced, thereby preventing the destruction of the greater portion and, in effect, the maximum portion of the heat units in the fuel beds in this zone of the furnace.

The sheathing 2 may comprise in practice upper and lower overlapping sections 10 and 12 respectively, as shown in Fig. 1, and secured to the sheathing is an angle ring 14, the horizontal leg 16 of which is seated in a recess formed in the upper edge of the refractory lining 8 and said leg has secured thereto a liner centering ring 18 by suitable fasteners such as the bolts 20; the liner 8 being provided with suitable recesses 22 for an obvious purpose. The ring 14 may be a continuous ring, if desired, but, in practice, it has been found preferable to form the ring of a plurality of segments each having attaching flanges 24 formed at the ends thereof and extending from the vertical leg 26; the segments being arranged end to end to define a continuous ring and with the flanges 24 arranged adjacent each other and connected together by suitable fasteners such as the bolts 28.

The liner of the present invention comprises a plurality of superposed rings and, in the instance shown in the drawings, five rings have been shown, the same being designated as 30, 32, 34, 36 and 38, respectively, the liner also including what I term a sealing ring 40 superposed on the upper ring 38. It is to be understood that the specific number of rings may be varied to suit desired or required conditions, but, in practice, it has been found that, because of the heat to which these rings are subjected, it is desirable to utilize rings of relatively short height as they withstand continuous expansion and contraction to better advantage than rings of considerable height.

The liner rings 30 to 38, inclusive, are identical in structure, and a description of one will suffice for all. Considering now ring 30, for example: As shown more clearly in detail in Fig. 3, the lower end of the ring is provided with a circumferential flange 42 spaced from the lower end of the ring and adapted to seat on the centering ring 18; the latter being of a diameter sufficient to provide a clearance 43 between the inner edge of said ring 18 and the lower end of the ring 30. The upper end of ring 30 is, in effect, outwardly offset to provide an upwardly extending marginal flange 46 which defines an internal annular recess around the upper edge of the ring 30 into which recess the lower end of superposed ring 32 extends to be supported by the ring 30. The circumferential flange 42 of superposed ring 32 rests upon the flange 46. Attention is called to the fact that the offset at the upper end of each ring is so arranged that the internal annular recess formed thereby is of sufficient depth to provide a clearance 48 between the flange 46 and the lower end of the superposed ring. This is considered important, in view of the fact that the liner A is subjected to decreasing temperatures from the lower end thereof towards the upper end, and it will be apparent that the lower rings, for example rings 30 and 32, are subjected to greater heat than the rings 34, 36 and 38, respectively, and that ring 30, being subjected to greater heat than ring 32, will expand a greater amount than ring 32, and, therefore, it is necessary that ring 30 be permitted to expand a greater amount than ring 32. To provide for this arrangement, the superposed rings are inset on the lower rings so that the upper edges of the rings, which are subjected to greater heat, may expand away from the lower edges of the superposed rings. This, it will be evident, precludes any possibility of the adjacent edges of superposed rings binding against each other and thus reduces the possibility of fracturing or breaking said adjacent edges or any portions thereof. For reinforcing purposes, the rings are provided with vertical stiffeners 50 which extend between the flanges 42 and the upper ends of the rings, as clearly shown in Fig. 3.

In the operation of the furnace of the present invention, it is apparent that the rings forming the metallic liner will expand and contract. The approximate amount of expansion of the rings is known, or can easily be determined, and it is one purpose of this invention to permit a practically unimpeded expansion of the rings to the full extent thereof. It has been found that sometimes during expansion the rings will get out of round, or become otherwise distorted, and, to counteract such a disadvantage, I provide means for strengthening the rings at approximately the limit of their expansion; the rings being adapted to contact therewith to restrain the liner rings against distortion or getting out of round. Fundamentally, these just mentioned means comprise rings, which I term "shape" rings, indicated generally in Figs. 3 and 5 at 60, and they may assume many forms, dependent upon the design desired. In Figs. 3 and 5, there are shown two modifications of these shape rings which are supported on lugs 52 formed at the upper ends of the liner rings; a plurality of these lugs being provided for each liner ring. Referring now to the form of shape ring shown in Fig. 3, it can be seen that the same includes primarily a vertically arranged ring or annulus 54 having an external laterally extending continuous flange 56 arranged intermediate the upper and lower edges thereof. At intervals corresponding to the distances between adjacent lugs 52, the annulus 54 is provided with projections 58 by which the shape rings are supported on the lugs 52.

The form of shape ring shown in Fig. 5 comprises merely an annulus indicated at 62 and having segmental openings 64 formed along its inner edge to define projections 66 adapted to seat on the lugs 52, as clearly shown in Figs. 3 and 5. The projections 58 and 66, respectively, of the shape rings are arranged adjacent to but spaced from the joint formed by the superposed rings, thereby providing a clearance space 59, which space is sufficient to permit the full expansion of the liner rings, and the distance between diametrically opposed projections 58 and 66, respectively, is such that when the rings have reached the limit of their expansion they engage against said projections. In this connection, attention is called to the fact that the shape rings, being positioned in the air chamber, do not expand the same amount as the liner rings, and even though the shape rings and liner rings be formed of the same material, the shape rings will function in the manner just mentioned.

As before mentioned, the temperature in the furnace shaft at the metallic liner portion decreases successively towards the upper portion of the liner, and therefore it is apparent that the lower rings will be subjected to greater temperatures than the upper rings. In other words, the expansion of the several rings is successively decreased in amount, and therefore the shape rings have successively decreasing diameters. By this I means that the diameter of the lowermost shape ring is larger than the diameter of the uppermost shape ring, but the approximate amount of expansion of the liner rings being capable of determination, the shape rings can, of course, be correspondingly graduated as to size; the sizes being such that when the rings have reached the limit of their expansion, they will engage the shape rings to be restrained thereby against deformation. These shape rings also serve an added purpose. Due to continual expansion and contraction, it may happen that the lower rings of the metallic liner will crack, or even break, as no metal known at the present day is proof against cracking or breaking under extreme temperature conditions. In the event of such an occurrence, and in the absence of some means for retaining the ring fragments or broken sections together, the material from the shaft of the furnace may escape therefrom and even burst through the shaft causing great damage. It is one function of the shape rings to retain the rings in substantially assembled form should they break or crack during operation of the furnace; the rings, it is apparent, serving to prevent the scattering of the fragments of a broken ring and thus prevent leakage or escape of the material from the shaft.

As before mentioned, the metallic liner A defines with the sheathing 2 an air heating chamber B. The lower end of this heating chamber is closed by the ring 18 and its associated liner ring 30. Superposed on the ring 38 is a lining ring 40 which I term a sealing ring, the construction of which is clearly shown in Figs. 1 and 7. Said ring 40 is of the same diameter as the remaining liner rings, and its lower end is extended into the internal annular recess at the upper edge of ring 38, and said ring 40 is provided with a circumferential shoulder 70 around its lower end which seats on the flange 46 of the ring 38. The upper edge of the ring 40, however, is of different construction than the upper edges of the remaining liner rings, and, as a matter of fact, is substantially identical with the construction of the ring 40 at its lower edge, being provided with a circumferential flange 72 to which is secured by bolts 73 one edge of a flexible annular diaphragm 74, the outer edge of which is positioned between an angle 76 and a sealing plate 78, the diaphragm 74 being secured to said angle 76 by means of bolts 80 extending through the sealing plate 78 and through the leg 82 of the angle 76. The angle 76 may, if desired, be a continuous ring, but, in practice, it has been found advisable to form the same of angle segments having the legs 84 thereof secured to the sheathing 2 by bolts 86 which extend through said leg 84 and sheathing 2 and through a channel-shaped reinforcing ring 88 arranged exteriorly of the sheathing along the upper edge thereof. The segments of the angle ring 76 are preferably provided with ribs 90 at each end thereof which, when the segments are assembled to form a complete ring, are positioned adjacent each other and said segments are connected together by bolts 92 or other suitable fasteners. The ring 40 does not extend into contact with the sealing plate 78, but its upper edge is spaced therefrom, as shown at 94, whereby to permit vertical expansion of the metallic liner A should the same occur during operation of the furnace.

Air is admitted to heating chamber B through intake 96 arranged near the upper end of the chamber, and air is heated in said chamber and passes from the chamber into down-comer 98 from where it passes into the wind-box (not shown) of the furnace, and from there it is injected into the furnace shaft through the usual tuyères. It may be desirable to provide a means whereby the air admitted through the intake 96 is positively directed into contact with the metallic liner A, and, to affect this, baffles 100 may be provided which are secured to the sheathing 2 in any suitable manner and which may be annular in form with the inner edges of said baffles arranged intermediate the upper and lower edges of the individual liner rings. It will be apparent that by arranging the lower edges of the baffles 100, as just described, the air is forced into contact with the rings intermediate the upper and lower flanges thereof. Attention is called to the fact that the intake 96 is arranged near the upper portion of the air chamber which is in contradistinction to an arrangement in which the intake may be at the lower end of the chamber. It has been found that, if the air is admitted at the lower end of the chamber where the liner rings are at a higher temperature than the rings at the upper end of the liner, the atmospheric air, being cool, is injected against the hottest part of the liner, and, in the event of the atmospheric air being very cold, the reaction against the hot liner ring may be disastrous. In view of this, the air is injected into the chamber against the cooler rings and gradually increased in temperature towards the lower end of the chamber, thereby preventing adverse results on the hottest liner rings.

From the above description, it is believed that the operation of the furnace will be fully apparent to those skilled in the art, but attention is called to the fact that when a furnace is charged in the usual manner, with alternate beds of fuel and ore and the furnace ignited, hot gases or products of combustion will pass upwardly through the shaft of the furnace and heat the metallic liner A. The air in chamber B will take heat from this liner, thereby permitting the liner to take up more heat from the adjacent zone of the furnace shaft, thus reducing the temperature in the shaft adjacent the liner and preventing material destruction of the heat units in the fuel in said zone, thereby preserving said heat units until they reach the preheating zone of the furnace. During the operation of the furnace, the metallic liner rings will expand and, at the limit of their expansion, they engage the shape rings and said shape rings prevent the liner rings from getting out of round, thereby lengthening the life of the liner rings.

It is also apparent that by preserving the heat units in the fuel in the zone of the furnace shaft adjacent the metallic liner a great saving in fuel is effected resulting in an economical operation of the furnace described herein.

The drawings disclose the preferred embodiment of the invention, but it is to be understood that they are for illustrative purposes and that various changes in the form and proportions may be made within the scope of the appended claims without departing from the spirit of the invention.

What is claimed is:

1. In a cupola furnace, a sheathing, a shaft having a portion thereof defined by a metallic liner spaced from the sheathing to form an air heating chamber and comprising a plurality of rings, and means independent of the sheathing surrounding said rings for restraining them against distortion.

2. In a cupola furnace, a sheathing, a lining for the furnace formed in part of superposed metallic rings so arranged in superposed relation as to permit unimpeded expansion of each thereof, and means supported by the rings adjacent the junctures of superposed rings and with which the rings contact when expanded to restrain the rings against distortion.

3. In a cupola furnace the shaft of which is formed in part of superposed metallic rings adapted to expand under the influence of the heat in said shaft, means for retaining the metallic shaft rings in round comprising shape rings supported at the junctures of superposed shaft rings and with which the latter are adapted to contact when expanded.

4. In a coupola furnace, the shaft of which is formed in part of superposed metallic rings adapted to expand under the influence of the heat in said shaft, means for reinforcing the rings when expanded and for retaining them in round comprising shape rings surrounding the metallic rings adjacent the junctures of superposed rings and of greater diameter than said superposed rings to provide an expansion space therebetween, and a plurality of inwardly extending lugs formed with each of said shape rings and with which said superposed rings contact when expanded.

5. In a cupola furnace, a sheathing, a liner formed in part of superposed metallic rings spaced from the sheathing to define an air heating chamber, said metallic liner terminating below the top of the furnace shaft to provide a clearance space to permit unimpeded vertical expansion of said liner, a flexible sealing means at the upper portion of the air heating chamber, said metallic rings being adapted to freely expand laterally, and means with which the rings contact when expanded laterally substantially their limit for reinforcing the same and for retaining them in round.

6. A cupola furnace comprising a sheathing, a metallic liner forming the upper portion of the shaft of the furnace and defining with the sheathing an air heating chamber, said liner comprising a plurality of rings each having an internal annular recess at its upper end to support a superposed ring, said recess being of greater diameter than the diameter of the superposed ring, whereby to permit unrestrained expanison of the rings relative to each other, and means for sealing the upper end of the air heating chamber.

7. A cupola furnace comprising a sheathing, a metallic liner forming the upper portion of the shaft of the furnace and defining with the sheathing an air heating chamber, said liner comprising a plurality of rings each having an internal annular recess at its upper end to support a superposed ring whereby to permit unrestrained expansion of the rings relative to each other, means for sealing the upper end of the air heating chamber, and means surrounding the rings with which the latter contact when expanded to reinforce said rings and to retain them in round.

8. A cupola furnace comprising a sheathing, a metallic liner forming the upper portion of the shaft of the furnace and defining with the sheathing an air heating chamber, said liner comprising a plurality of rings each having an internal annular recess at its upper end to support a superposed ring whereby to permit unrestrained expansion of the rings relative to each other, means for sealing the upper end of the air heating chamber, and means surrounding the rings adjacent the junctures of superposed rings with which the latter contact when expanded to reinforce said rings and to retain them in round.

9. In a cupola furnace, a metallic liner formed of superposed sections each comprising a metallic ring having a circumferential shoulder adjacent its lower end and an outwardly offset upper end definding a forwardly extending supporting shoulder and an internal annular recess adapted to receive the lower end of a superposed ring.

10. In a cupola furnace, a metallic liner formed of superposed sections each comprising a metallic ring having a circumferential shoulder adjacent its lower end and an outwardly offset upper end defining a forwardly extending supporting shoulder and an internal annular recess adapted to receive the lower end of a superposed ring, and a circumferential shoulder formed adjacent to but spaced from the end of said forwardly extending supporting shoulder.

11. In a cupola furnace, a sheathing, a refractory liner at the lower portion of the furnace shaft, a metallic liner supported by the refractory liner and extending upwardly adjacent the upper end of the shaft but spaced from the latter to provide an expansion space, said liner defining with the outer sheathing an air heating chamber and being formed of a plurality of superposed rings the upper edge of each of said rings having an annular retaining flange overlapping but spaced from the lower edge of the ring supported thereby whereby to permit unrestrained expansion of the lower ring under the influence of heat in the furnace shaft, and shape rings supported by said liner rings at the junctures of adjacent rings with which said liner rings contact when expanded to reinforce the latter and to retain them in round.

12. In a cupola furnace, a sheathing, a refractory liner at the lower portion of the furnace shaft, a metallic liner supported by the refractory liner and extending upwardly adjacent the upper end of the shaft but spaced from the latter to provide an expansion space, said liner defining with the outer sheathing an air heating chamber and being formed of a plurality of superposed rings the upper edge of each of said rings having an annular retaining flange overlapping but spaced from the lower edge of the ring supported thereby whereby to permit unrestrained expansion of the lower ring under the influence of heat in the furnace shaft, shape rings supported by said liner rings at the junctures of adjacent rings and with which said liner rings contact when expanded to reinforce the latter and to retain them in round, a sealing ring at the upper end of the metallic liner and forming a part of the latter, and flexible sealing means connected to said sealing ring for closing the upper end of the air heating chamber.

13. In a cupola furnace the shaft of which is formed in part of individually expansible superposed metallic rings, shape rings supported adjacent the upper edges of said metallic rings and at the juncture of the superposed rings therewith for reinforcing said metallic rings and for retaining them in round when expanded.

14. In a cupola furnace the shaft of which is formed in part of a liner formed of individually expansible superposed metallic rings, means for reinforcing said liner rings and for retaining them in round comprising shape rings supported by said liner rings adjacent the upper edges thereof and at the juncture of the superposed rings therewith and with which said liner rings contact when expanded.

15. In a cupola furnace, an outer sheathing, a metallic liner forming a part of the furnace shaft and defining an air heating chamber, said liner being formed of a plurality of individually expansible superposed rings, and means for directing air into contact with the rings intermediate their upper and lower edges comprising annular baffles secured to the sheathing and extending downwardly therefrom with their lower edges arranged in a horizontal plane below that of the upper edges of the rings.

16. In a cupola furnace the shaft of which is formed in part of a metallic liner adapted to expand vertically under the influence of heat in the shaft, an outer sheathing defining with the liner an air heating chamber, means for preventing escape of air from the chamber at the upper end thereof comprising a flexible sealing diaphragm connected to the upper end of the metallic liner and closing the upper end of the air chamber.

17. In a cupola furnace the shaft of which is formed in part of a metallic liner adapted to expand vertically under the influence of heat in the shaft, an outer sheathing defining with the liner an air heating chamber, a sealing ring at the upper end of the shaft, and means for preventing escape of air from the chamber into the shaft at the upper end of the chamber comprising a diaphragm connected to the upper end of the metallic liner and to the sealing ring.

In witness whereof I have hereunto set my hand.

FREDERICK A. STEVENSON.